United States Patent [19]

Tabor

[11] 4,153,238
[45] May 8, 1979

[54] NUT CRACKER TABLE

[76] Inventor: Jewel F. Tabor, P.O. Box 869, Water Valley, Tex. 76958

[21] Appl. No.: 894,808

[22] Filed: Apr. 10, 1978

[51] Int. Cl.² .............................................. B25B 11/00
[52] U.S. Cl. ...................................................... 269/15
[58] Field of Search ................ 269/13, 15, 302.1, 289, 269/327; 108/24

[56] References Cited

U.S. PATENT DOCUMENTS

| | | | |
|---|---|---|---|
| 951,506 | 3/1910 | Meyer | 269/15 X |
| 2,609,024 | 9/1952 | Russ | 269/15 |
| 2,796,902 | 6/1957 | Mercury | 269/13 |

*Primary Examiner*—Robert C. Watson
*Attorney, Agent, or Firm*—Daniel Jay Tick

[57] ABSTRACT

A nut cracker table has a rectangular board-like table top supported by a plurality of legs above a supporting surface. A hole is formed through the table top. A chute is affixed to the undersurface of the table top under the hole and directs shelled nuts to a specific area under the table top. A shield is affixed to the oversurface of the table top to prevent the hulls of nuts cracked by a nut cracker on the oversurface from scattering.

1 Claim, 3 Drawing Figures

NUT CRACKER TABLE

BACKGROUND OF THE INVENTION

The present invention relates to a nut cracker table. More particularly, the invention relates to a nut cracker table for accommodating a nut cracking device, directing shelled nuts to a specific area and preventing the hulls from scattering.

Tables similar to that described herein are disclosed in the following United States patents. U.S. Pat. Nos. 1,106,057, issued Aug. 4, 1914 to Puckett, 1,834,347, issued Dec. 1, 1931 to Nixon, 2,022,591, issued Nov. 26, 1935 to Everitt, 2,506,532, issued May 2, 1950 to Wilson, 2,745,452, issued May 15, 1956 to Hawkens and 4,009,651, issued Mar. 1, 1977 to Adams.

Objects of the invention are to provide a nut cracker table of simple structure, which is inexpensive in manufacture, used with facility and convenience, and functions efficiently, effectively and reliably to direct shelled nuts to a specific area where they may be collected, as desired, in desired containers, and preventing the hulls from scattering.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
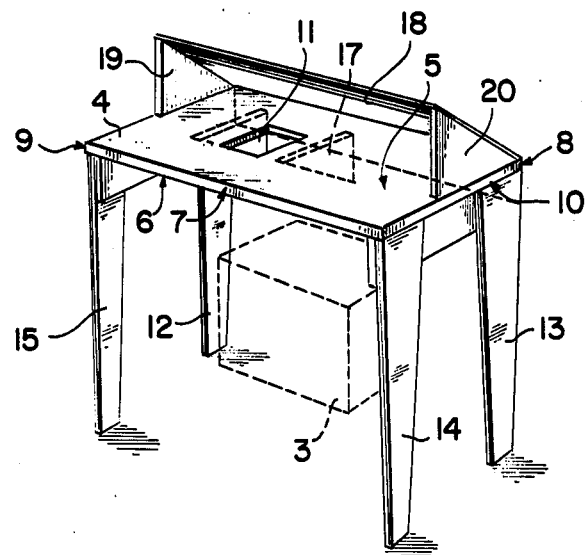
FIG. 1 is a perspective view of an embodiment of the nut cracker table of the invention.
Figure 2:
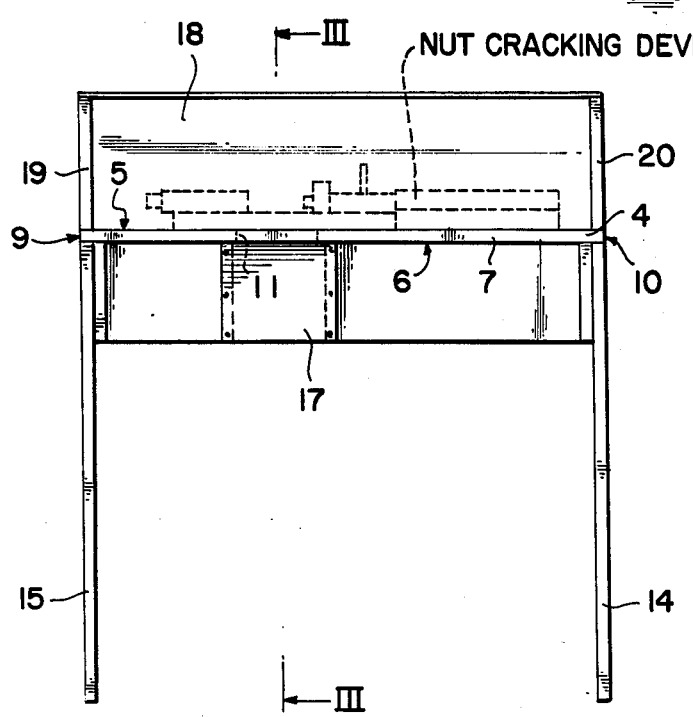
FIG. 2 is a front view, on an enlarged scale, of the embodiment of FIG. 1.

The nut cracker table of the invention accommodates a nut cracking device 1 of any suitable type, shown by broken lines in FIG. 2. The nut cracker table of the invention directs shelled nuts to a specific area 2 (FIG. 1) so that they may be collected in any desired container 3 in such specific area, and prevents the hulls from scattering.

The nut cracker table of the invention comprises a substantially rectangular board-like table top 4 having an oversurface 5 and a spaced parallel undersurface 6. The table top 4 has space parallel front and rear edges 7 and 8 (FIGS. 1 and 3) and a pair of spaced parallel side edges 9 and 10 (FIGS. 1 and 2) perpendicular to said front and rear edges and joining said front and rear edges. The table top 4 has a hole 11 formed therethrough (FIGS. 1 to 3).

Figure 3:
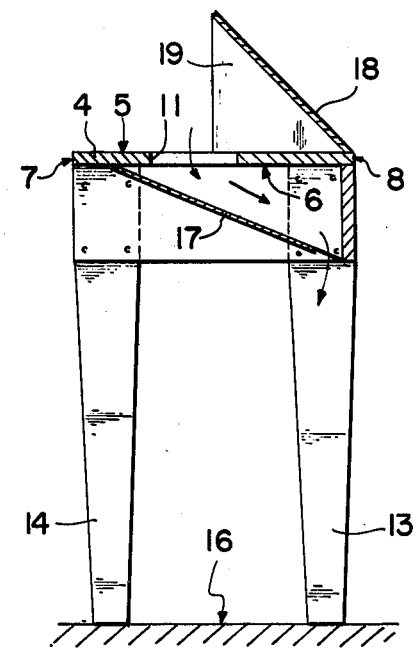
FIG. 3 is a cross-sectional view, taken along the lines III—III, of FIG. 2.

A plurality of legs 12, 13, 14 and 15 support the table top 4 at a distance above a supporting surface 16 (FIG. 3).

A chute 17 is affixed to the undersurface 6 of the table top 4 under the hole 11 through said table top and directs shelled nuts to the specific area 2 under said table top, where they are collected in the container 3.

A shield is affixed to the oversurface 5 of the table top 4 for preventing the hulls of nuts cracked by the nut cracking device 1 on said oversurface from scattering. The shield has a back part 18 extending over the oversurface 5 of the table top 4 from the rear edge 8 of said table top at an angle with said table top. The shield also has a pair of side parts 19 and 20. The side part 19 extends from the back part 18 to the side edge 9 of the table top 4 and the side part 20 extends from said back part to the side edge 10 of said table top. Each of the side parts 19 and 20 is of substantially right triangular configuration with its hypotenuse abutting the back part 18 and one of its sides abutting the oversurface 5 of the table top 4. The side parts 19 and 20 extend substantially perpendicularly to the oversurface 5 of the table top 4.

While the invention has been described by means of a specific example and in a specific embodiment, I do not wish to be limited thereto, for obvious modifications will occur to those skilled in the art without departing from the spirit and scope of the invention.

I claim:

1. A nut cracker table for accommodating a nut cracking device, directing shelled nuts to a specific area and preventing the hulls from scattering, said nut cracker table comprising a substantially rectangular board-like table top having an oversurface, a spaced parallel undersurface, spaced parallel front and rear edges and a pair of spaced parallel side edges perpendicular to the front and rear edges and joining said front and rear edges, said table top having a hole formed therethrough;

a plurality of legs supporting said table top at a distance above a supporting surface;

a chute affixed to the undersurface of said table top under the hole through said table top for directing shelled nuts to a specific area under said table top; and a shield affixed to the oversurface of said table top for preventing the hulls of nuts cracked by a nut cracking device on said oversurface from scattering, said shield having a back part extending over the oversurface of said table top from the rear edge of said table top at an angle with said table top and a pair of side parts each extending from said back part to a corresponding one of the side edges of said table top, said side parts extending substantially perpendicularly to said oversurface.

* * * * *